April 16, 1957     D. MEKLER     2,789,255
PROTECTIVE DEVICE FOR ELECTRIC OUTLET AND IMPLEMENTS
CONNECTED THEREWITH
Filed May 13, 1953     2 Sheets-Sheet 1

INVENTOR
DAN MEKLER
BY

INVENTOR
DAN MEKLER
ATTORNEY.

United States Patent Office 2,789,255
Patented Apr. 16, 1957

2,789,255

PROTECTIVE DEVICE FOR ELECTRIC OUTLETS AND IMPLEMENTS CONNECTED THEREWITH

Dan Mekler, New Market, Meah Shearim, Jerusalem, Israel

Application May 13, 1953, Serial No. 354,817

Claims priority, application Israel December 23, 1952

2 Claims. (Cl. 317—18)

The present invention relates to a protective device for electric outlets and implements connected therewith.

Electric outlets, fixtures or electrical implements connected to such outlets, even in "off" position, present a source for shock, life and fire hazards.

It is, therefore, one object of my present invention to eliminate such hazards by providing a device in a circuit, which is disposed in a small casing and connected with an outlet or connector. The present invention is based on the fact that the difference between the resistances of any implement which is used in general, and that of the human body is so large that, while the current passing through the implements the resistance can effect the activation of an electromagnetic relay, the resistance of the human body permits the passing of a fractional part of this current only, which is unable to activate any of the relays employed in the arrangement. The resistance of smaller implements used in a line of 220 volts is about 5,500 ohms, and if connected in series with a field-coil of the above mentioned relay, which is connected to a tension divider, about 30 volts, provides a current sufficient to activate the relay. Implements with higher power consumption connected to this device pass more current according to their smaller resistances, but do not damage the relay because such action is of a duration of a fraction of a second. The resistance of the human body, however, upon touching a live point of the implement, or a live point of the socket to which the implement is connected, is about 40 kilo ohms. The current in the circuit of a power source of 30 volts, the field-coil of the relay, the human body and earth is very small, namely about 0.5 ma., that means entirely harmless to human life, but not able to activate the relay which requires at least about 3 ma.

It is another object of the present invention to provide a device which consists of an arrangement comprising substantially four circuits, the first of which includes a resistance, a bleeder, a transformer or the like, which makes the outlet before which this device is installed practically tensionless, and of provisions consisting of a series of preferably three electromagnetic relays, coming into action upon connecting an implement to said outlet, by consecutively closing new circuits, in the course of which the effect of the before mentioned resistance, transformer or the like is eliminated and current of the necessary voltage is supplied.

With these and other objects in view which will become apparent in the following detailed description, the present invention will be clearly understood in connection with the accompanying drawings, in which.

Figure 1:
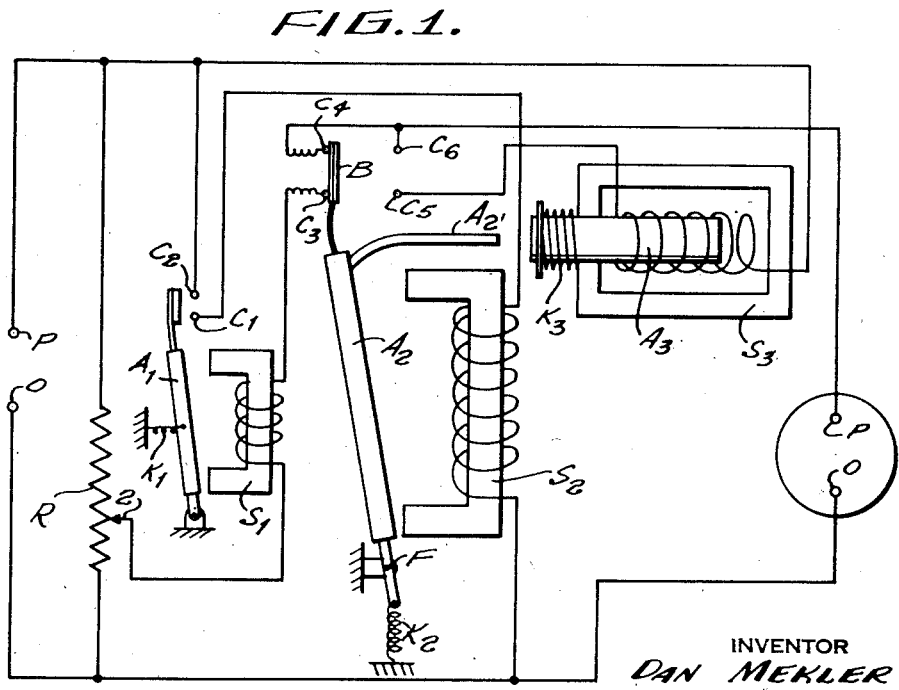
Figure 1 is a schematic diagram of one embodiment of the present invention.

Referring now to the drawing, and in particular to Fig. 1, the present device comprises an electric resistance, bleeder, or the like R which is permanently connected in the circuit. The resistance R is capable of carrying the load required to activate the arrangement, i. e. of between 4 and 10 ma. The said resistance is tapped at a point 2—nearer to zero—so that the voltage between 2 and zero is approximately 30 volts and, therefore, harmless to the human body.

This point 2 is further connected to the coil of an electromagnetic relay $S_1$. The other end of this coil is connected to a contact $C_3$ of a second electromagnetic relay $S_2$, and contact $C_3$ is connected in turn through a contact-bar B with the contact $C_4$. The contact-bar B is mechanically connected with the armature $A_2$ of the relay $S_2$. The line continues from these contacts $C_3C_4$ to one pole of the outlet O—P or to the system which is controlled by the arrangement in accordance with the present invention. This line must be connected to the pole of the wire P which normally receives the phase. The outlet O—P or the system, respectively controlled by the arrangement, when in "off" position, is absolutely safe; since the live point has about 30 volts only. A human being, who contacts the outlet or an uninsulated wire of or connected with said outlet, owing to the resistance of the human body of about 40,000 ohms, closes the circuit, however, creating a current of about 0.5 ma., so that the coil of relay $S_1$ cannot be activated, and which is harmless to the human body.

The small implements, however, which are commonly used, are at least of about 10 watts, with a resistance of not more than 5,500 ohms in a line of 220 volts. Therefore, if connected to such outlet, the current in this circuit will be big enough to activate the relay (the resistance of said relay being about 2,500 ohms).

As soon as the relay $S_1$ is in operation, the contacts $C_1C_2$ are closed, thus in turn closing another circuit which starting from the power source flows to the coil of the relay $S_2$; the other end of this coil connects with zero. Simultaneously, the relay $S_2$ is set in operation. The armature $A_2$ of the relay $S_2$ is operated toward the poles of its electromagnet, moving the contact-bar B away from the contacts $C_3C_4$. The current, however, is not interrupted, because of the flexibility of the particular resilient contacts. One end of the armature $A_2$ is rotatably fixed to an axis F which is fastened to a spring $K_2$, working in accordance with the known principle of "trigger-action," in order to aid the motion of the armature in the "dead point," i. e. the moment of current interruption. At the beginning of the motion of the said armature $A_2$, the mentioned spring $K_2$ is compressed, but released in the instant of interruption of current and, accordingly, pushing the armature $A_2$ into contact with the poles of the electromagnet. The circuit $C_3C_4$ is broken at the moment of such action, thus inactivating the relay $S_1$ and the armature $A_1$ returns by action of a spring $K_1$ to its previous inactive position.

At this stage, then, the circuit is broken at both $C_1C_2$ (by the action of spring $K_1$) and at $C_3C_4$, but is not yet closed at $C_5C_6$ by the contact-bar, while the armature $A_2$ is completing its movement towards the poles of its magnet and towards closing the circuit at $C_5C_6$ by the action of spring $K_2$.

When the armature $A_2$ comes in contact with its magnet, thus closing the circuit $C_5C_6$, a third circuit is created, starting from the power source, flowing through the coil of a solenoid $S_3$, thence to $C_5C_6$ and on the outlet. From here, through the connected implement (when turned "on") and ends at zero.

The current can now flow through the attached implement in full force. While passing through the solenoid $S_3$ the current pulls in the solenoid armature $A_3$, the latter action compressing a spring $K_3$. To keep the armature $A_3$ attracted, the solenoid consumes a fractional part of the total voltage.

From this stage on the implement attached to the outlet O—P is alive and dangerous to human beings.

When the attached implement is switched "off" or disconnected from the outlet, the current in the solenoid $S_3$ is interrupted and the spring $K_3$ therein released forces armature $A_3$ to strike the armature $A_2$ by means of an arm $A_2'$ projecting from the armature $A_2$ back into its original position. All contacts of the protective device are now back in their starting positions of the operation and the voltage in outlet O—P amounts again to about 30 volts.

Figure 2:
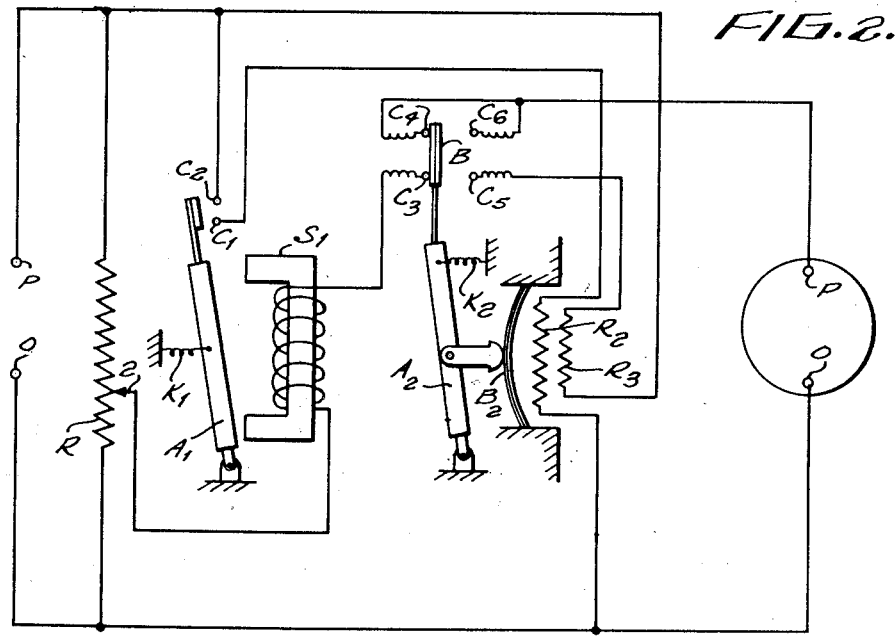
Fig. 2 is a schematic diagram of another embodiment of the present invention.

As a modification, as disclosed in Fig. 2 of the drawing instead of three electromagnetic relays only one such relay can be employed, and the other two relays may be replaced by one bimetal element.

Point 2 remains connected to the coil of the electromagnetic relay $S_1$, the other end of this coil connected to the contact $C_3$, and the latter through the contact-bar B connected with contact $C_4$. The contact-bar B is mechanically connected with a disc, strip or the like of bimetal $B_2$. As soon as the relay $S_1$ is in operation, the contacts $C_1C_2$ are closed, thus closing another circuit which starting from the power source flows to a heating coil $R_2$, which is arranged near the above mentioned bimetal element $B_2$; the other end of the coil $R_2$ connects with zero. At the same time the bimetal element $B_2$ is being heated by the heating coil $R_2$ and, accordingly, set in operation, namely, the disc, strip, or the like, of bimetal $B_2$ is starting its characteristic motion into its opposite position, thus moving the contact-bar B away from the contacts $C_3C_4$ towards the contacts $C_5C_6$. This motion is a sudden, jumping action (a snappy or trigger action), in order to overcome the dead point, caused by the unequal expansion coefficient of the two components of the bimetal. The circuit is boken at the contacts $C_3C_4$ at the moment of such action, thus inactivating the electromagnetic relay $S_1$, and armature $A_1$ returns by force of the spring $K_1$ to its original position. At this stage the circuit is broken at both places, namely at the contacts $C_1C_2$ (by the action of spring $K_1$) and at the contacts $C_3C_4$.

When the bimetal $B_2$ is in the opposite of its original position, thus closing the circuit through the contacts $C_5C_6$, a third circuit is created, starting from the power source flowing through a heating coil $R_3$, arranged also near the bimetal element $B_2$, then to the contacts $C_5C_6$ and finally to the outlet O—P.

Figure 3:
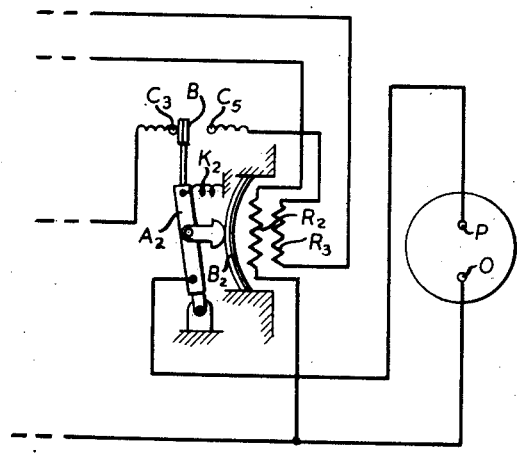
Figs. 3 and 4 are fragmentary circuits showing two variations in the circuit in connection with the contact bar.
Figure 4:
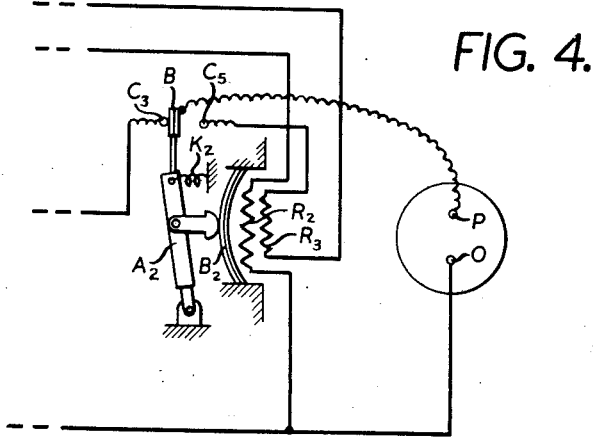

A further modification can be arranged by shifting the function of the contacts $C_4$ and $C_6$ to the contact-bar B itself, by connecting said contact-bar B by means of a flexible wire or its fixed end to the pole of the outlet which receives the phase (Figs. 3 and 4). In this case, the contacts $C_4$ and $C_6$ may be omitted.

The current can now flow through the attached implement in full force. While passing through the heating coil $R_3$ the current heats this coil. To keep the bimetal $B_2$ in is position closing the contacts $C_5C_6$, the heating coil $R_3$ consumes a fractional part of the voltage.

From this stage on the implement attached to the outlet O—P is alive and dangerous to human beings. When the attached implement is switched "off" or disconnected from the outlet, the current in the heating coil $R_3$ is interrupted and the bimetal element $B_2$ cooling down, and consequently returning to its original position. Again, all contacts of the protective device are now back in their starting positions of the operation and the voltage in the outlet O—P cannot go beyond 30 volts.

While I have disclosed several embodiments of the present invention, it is to be understood that these embodiments are given by example only and not in a limiting sense, the scope of the present invention being determined by the objects and the claims.

What I claim is:

1. A protective system for electric outlets and implements connected therewith, comprising a live wire and a neutral having a predetermined voltage established between said live wire and said neutral, a resistance disposed between the said live wire and the said neutral and having a tap, a first and a second electromagnetic relay, both said relays having an armature, a solenoid, the said first electromagnetic relay being operated by means of current established by a circuit through said tap of the said resistance and said neutral, said tap of said resistance reducing the original voltage supplied by the said live wire to about 20 to 30 volts, and means for actuating the second electromagnetic relay by means of the said first magnetic relay upon supplying the latter with a current of at least 3 ma., and means controlled by said second electromagnetic relay for restoring the original voltage by eliminating the said resistance and, thereby, to cause the actuation of the said solenoid by means of the current supplied by the said live wire, the said solenoid having an armature and a spring connected to the latter which spring is compressed by the attraction of the armature, the armature of the said solenoid being released upon interruption of the circuit and pushed forward by the said spring against the said armature of the said second electromagnetic relay, in order to restore it to its original position and, thereby, to reinsert the said resistance and to reduce again the voltage of the said live wire to about 20 to 30 volts.

2. A protective system for electric outlets and implements connected therewith comprising a live wire and a neutral having a predetermined voltage established between said live wire and said neutral, a resistance disposed between the said live wire and the said neutral and having a tap, an electromagnetic relay having an armature, said tap of the said resistance reducing the original voltage supplied by the said live wire to about 20 to 30 volts, the said electromagnetic relay being operated by means of current established by a circuit through said tap of the said resistance and said neutral and means including an armature and a spring connected to the latter which spring is compressed by the attraction of said armature, the latter being released upon interruption of the circuit by disconnecting said implements and pushed forward by the said spring against the said armature, in order to restore it to its original position, and thereby, to reinsert the said resistance and to reduce again the voltage of the said live wire to about 20 to 30 volts.

References Cited in the file of this patent

UNITED STATES PATENTS 2,079,636     Sharp _____ May 11, 1937